US010559189B1

(12) United States Patent
Menna

(10) Patent No.: US 10,559,189 B1
(45) Date of Patent: Feb. 11, 2020

(54) SYSTEM, METHOD AND APPARATUS FOR PROVIDING VOICE ALERT NOTIFICATION OF AN INCIDENT

(71) Applicant: John Dante Menna, Knoxville, TN (US)

(72) Inventor: John Dante Menna, Knoxville, TN (US)

( * ) Notice: Subject to any disclaimer, the term of this patent is extended or adjusted under 35 U.S.C. 154(b) by 0 days.

(21) Appl. No.: 16/220,656

(22) Filed: Dec. 14, 2018

(51) Int. Cl.
| | |
|---|---|
| *H04W 4/90* | (2018.01) |
| *G08B 25/01* | (2006.01) |
| *G08B 27/00* | (2006.01) |
| *G08B 21/02* | (2006.01) |
| *G08B 25/14* | (2006.01) |
| *G08B 25/10* | (2006.01) |
| *G08B 13/16* | (2006.01) |

(52) U.S. Cl.
CPC ....... *G08B 25/016* (2013.01); *G08B 13/1672* (2013.01); *G08B 21/02* (2013.01); *G08B 25/10* (2013.01); *G08B 25/14* (2013.01); *G08B 27/001* (2013.01); *H04W 4/90* (2018.02)

(58) Field of Classification Search
CPC ........ H04W 4/90; H04W 12/06; H04W 12/08
USPC ................................. 455/404.1, 404.2, 456.3
See application file for complete search history.

(56) References Cited

U.S. PATENT DOCUMENTS

| | | |
|---|---|---|
| RE44,225 E | 5/2013 | Aviv |
| 8,943,558 B2 | 1/2015 | Jankowski et al. |
| 9,159,210 B2 | 10/2015 | Jones, Jr. et al. |
| 9,686,664 B1 | 6/2017 | Amason et al. |
| 9,886,833 B2 | 2/2018 | Noland et al. |
| 10,032,351 B2 | 7/2018 | Showen et al. |
| 10,088,818 B1 | 10/2018 | Mathews et al. |
| 2005/0075116 A1 | 4/2005 | Laird et al. |
| 2010/0177193 A1 | 7/2010 | Flores |
| 2014/0218518 A1 | 8/2014 | Oliver |
| 2014/0269199 A1 | 9/2014 | Weldon et al. |
| 2015/0071038 A1 | 3/2015 | Boyden et al. |
| 2016/0203699 A1 | 7/2016 | Mulhern et al. |
| 2017/0103643 A1 | 4/2017 | Powers et al. |
| 2018/0069838 A1 | 3/2018 | Lee et al. |

*Primary Examiner* — Sam Bhattacharya
(74) *Attorney, Agent, or Firm* — Dunlap Bennett & Ludwig PLLC; Brendan E. Squire

(57) ABSTRACT

A system, method, and apparatus to alert individuals at a site to an incident, such as an active shooter. The site may involve a school campus or other site in which large numbers of people assemble. Receiver/transmitter assemblies are deployed in discrete occupation units of the site and communicate with a central server and are mapped to a specific location on the site. The receiver/transmitter assemblies communicate a voice alert to the server where it is analyzed to provide a localization of the incident and a mapping within the site. A notification provides information based on a role of the recipient where a first responder role receives information to contain the incident. Any building occupant can initiate an alert to others. Occupants unaware of the unfolding of an active shooter event may receive instructions to shelter in place or evacuate the site. Visual or audible egress routing may be provided.

14 Claims, 3 Drawing Sheets

SYSTEM, METHOD AND APPARATUS FOR PROVIDING VOICE ALERT NOTIFICATION OF AN INCIDENT

BACKGROUND OF THE INVENTION

The present invention relates to security systems and, more particularly, to security systems for alerting others to an active shooter incident.

On Feb. 14, 2018 in Parkland Fla., Nickolas Cruz (the Shooter) walked the halls of Marjory Stoneman High School for approximately 7 terrifying minutes. The school was unprepared to deal with the scenario that would unfold. On that day, life or death became a matter of chance. Seventeen people died on that horrific day.

Upon entering the school at approximately 2:21 pm, the Shooter encountered a freshman student heading up the east stairwell. The shooter warned the student (paraphrasing): get out because things are going to get messy. The freshman immediately left the school.

Shooting on the first floor started at approximately one minute after the Shooter enters the school. Smoke from his AR-15 rifle set off the school's fire alarm. Students responding to the fire alarm entered the hallways, potentially placing themselves directly in the line of fire. Tragically, 11 people were killed on first floor, either in hallways or in classrooms.

Not knowing with certainty that shootings were taking place, the school resource officer (SRO), at approximately 2:23 pm, reports over police radio "I think we have shots fired, possible shots fired . . . ." Unaware of the shooter's location, the school resource officer remained far from the shooter for the duration of the shootings.

The Shooter moves to the second floor. No one was killed on this floor possibly because, upon hearing shots fired, students and teachers hid in classrooms by covering classroom door windows and hiding in corners.

At approximately 2:24 pm, the Shooter moves to the third floor. These students, being farther from the sound of gunshots, respond to the fire alarm. They leave classrooms and head toward the east stairwell in the path of the Shooter. Realizing there is no drill or fire, students try to rush into classrooms. As some of the rooms were locked, students were exposed to direct gunfire in the hallway. By approximately 2:27 pm, the third floor is riddled with bullets killing 6 people.

As can be seen, there were a number of missed opportunities for alerting students from the shooters initial encounter with the freshman student to the shooter's destructive path to the third floor. Clearly, there is a need for an improved system, methods and apparatus to maintain a safe environment for students and alert them to a developing scenario involving an active shooter incident.

SUMMARY OF THE INVENTION

In one aspect of the present invention, a system for providing a voice alert, (one that is made through a spoken phrase) notification of an incident at a site having a plurality of discrete occupancy units is disclosed. The system includes an audio receiver/transmitter deployed in one or more of the plurality of discrete occupancy units. A server hosting an incident detection and notification system is in communication with the site. The server includes a recognition module that is in communication with the audio receiver/transmitter and is configured to recognize one or more predetermined voice alerts corresponding to one or more incident types monitored by the system. A localization module is configured to determine a location of the incident based on an acoustic level of the voice alert received by one or more of the audio receiver/transmitters and a mapping of each of the audio receiver/transmitters on the site.

In some embodiments, the recognition module may also provide a recognition of a vocal signature corresponding to the voice alert. The recognition module may also provide an indication of duress in the vocal signature. The localization module may determine the location of the incident based on the acoustic level of the vocal signature of the voice alert. In other embodiments, a spectral analyzer is provided to correlate an acoustic event with the incident. The acoustic event may include a firearm discharge.

In yet other embodiments, the localization module is configured to generate a localization diagram that provides a visual indication of the location of the incident on the site. The localization diagram may include a depiction of the acoustic level of the voice alerts received by one or more receiver/transmitters.

In other aspects of the invention, the system may also include a notification module that is configured to transmit one or more notifications of a detected incident, based on the nature of the detected incident and a role of the intended recipient of the notification. A notification to a first responder role includes information to contain or suppress an assailant. A notification may direct an occupant role recipient to shelter in place. The notification may direct an occupant role to flee from the incident. The notification may also provide egress routing instructions (visual or audible) to the occupant.

These and other features, aspects and advantages of the present invention will become better understood with reference to the following drawings, description and claims.

DETAILED DESCRIPTION OF THE INVENTION

Figure 1:
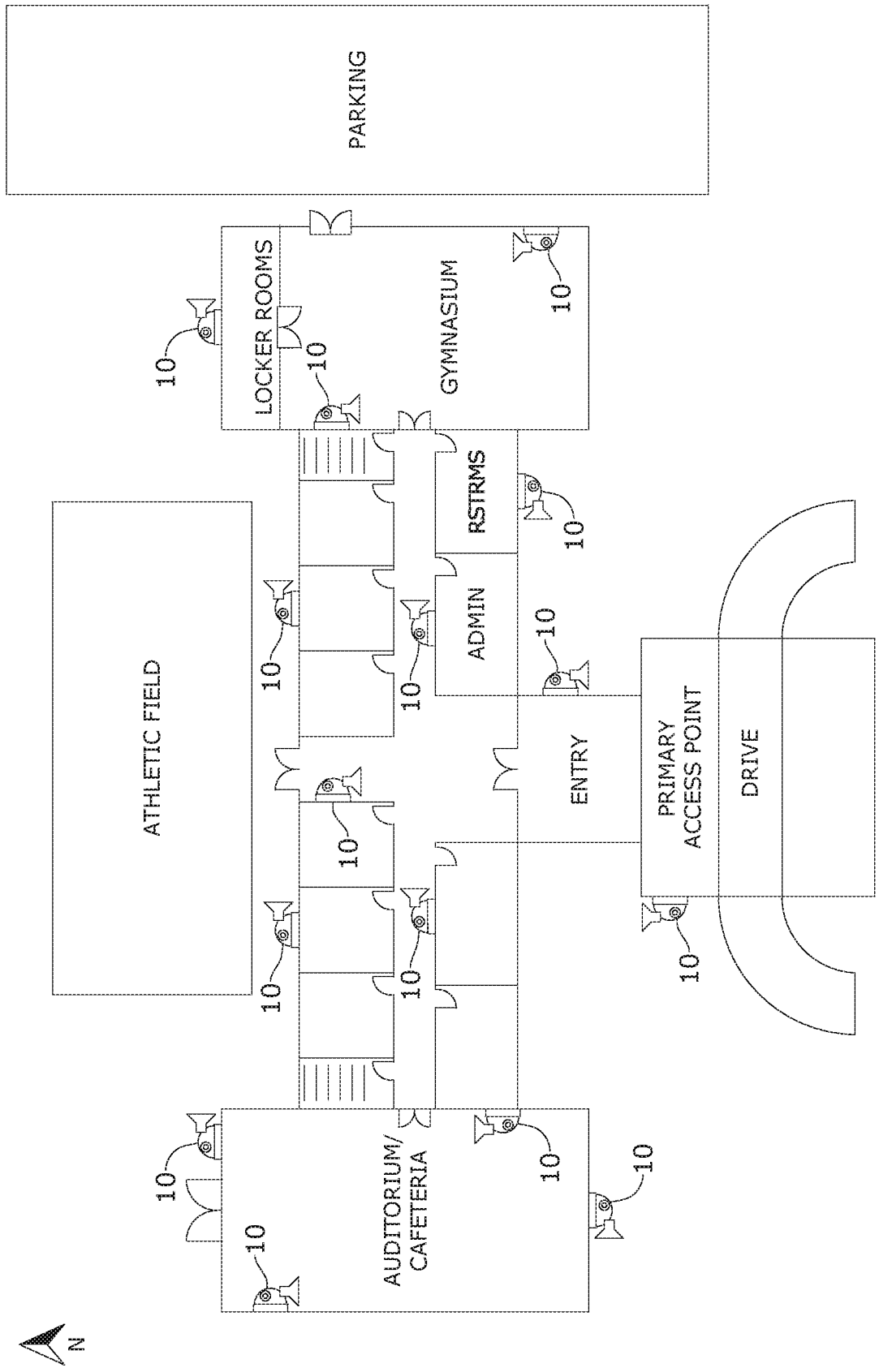
FIG. 1 is a schematic diagram of a site emplacement of the Principled Safety™ occupant notification system.
Figure 2:
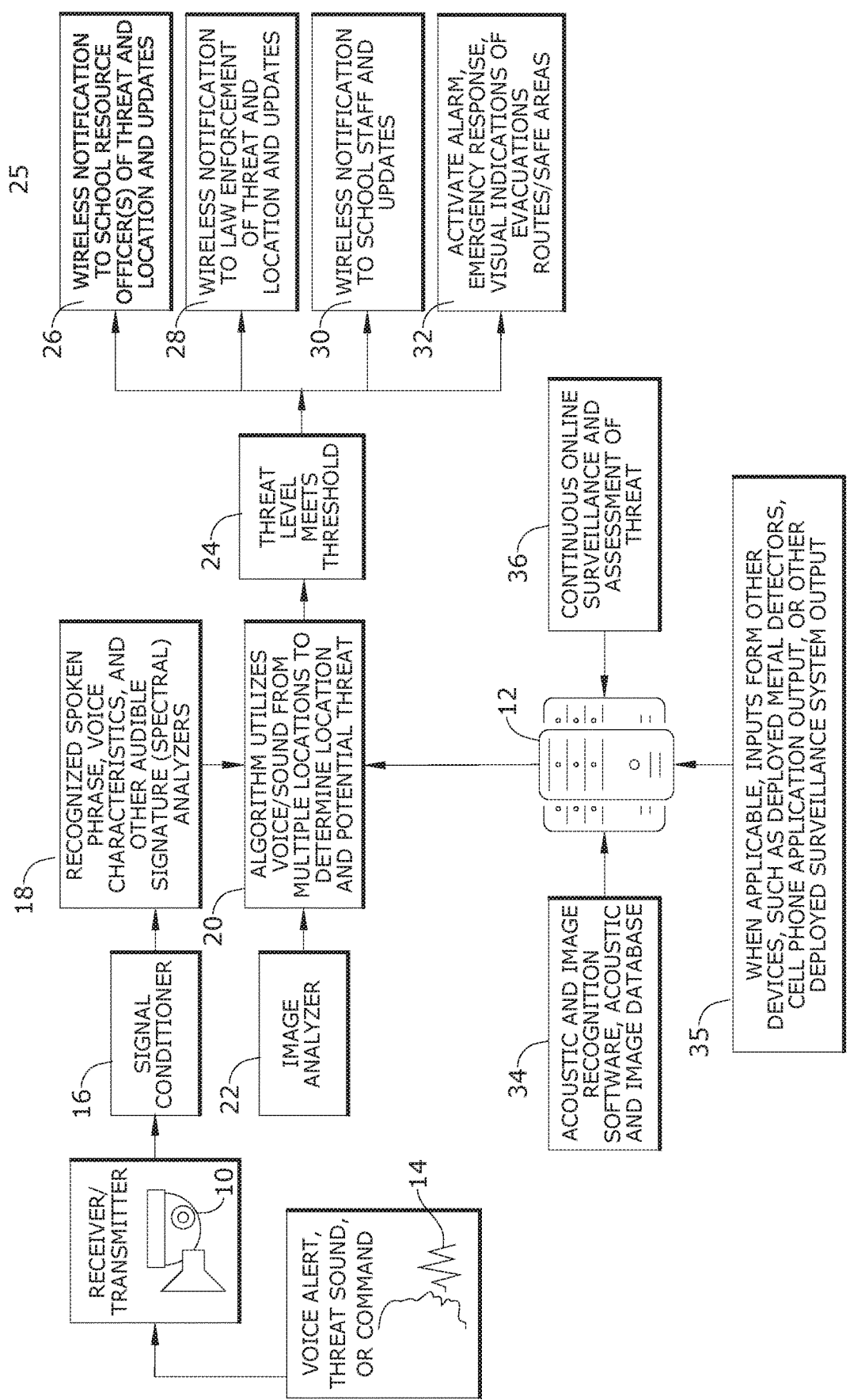
FIG. 2 is a schematic system diagram of a Principled Safety™ occupant notification system.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an improved system, method, and apparatus to alert individuals at a site to a developing scenario involving an incident, such as an active shooter incident, prior to and after firearms are discharged. The site may involve a school campus or facility, an office complex, a shopping mall, entertainment venue, or other site in which large numbers of people may be assembled. While a non-limiting example of the invention is discussed in the context of a school situation, the system is broadly applicable to other sites where people may be assembled.

A developing scenario involving an active shooter requires the earliest possible knowledge of the potential threat in order to take the appropriate actions to protect life. When these threats do not materialize to the degree that law enforcement can take action prior to an assailant entering the school grounds, protective measure must be in place and implemented to prevent harm. Most occupants in such a chaotic situation typically would not receive actionable information to protect themselves since the intentions and location of the shooter(s) are generally unknown. The establishment of effective protective measures is further complicated by the unpredictability of the shooter and the scenario the shooter decides to play out.

The means to detect a possible assault at its earliest stage after entering the school grounds is of paramount importance in protecting school occupants from an active shooter. The Occupant Notification System (O-NO) is designed to detect active shooter incidents as they develop, relay critical information to building occupants, and activate pre-established protective measures and emergency response actions. The building occupants include students, faculty, visitors, school resource officers (SROs) and staff. Two primary objectives of O-NO are to 1) assist in detecting an assailant prior to and following discharge of a weapon and 2) pinpoint the initial location and subsequent movement of the assailant within the building. Any occupant of the building, regardless of age, can initiate a voice alert.

The system of the present invention may be activated through simple spoken phrase-directed, voice notification alerts by the occupants of the site themselves in conjunction with remote video observation. As seen in reference to FIG. 1, the O-NO incorporates a plurality of voice/speech recognition and high definition video surveillance cameras incorporated with each speaker assembly 10 deployed in a discrete occupancy unit of the site to assist in identifying and tracking the location of the assailant. The plurality of receiver/transmitter assemblies 10 are in communication with a central server 12 and are each mapped to a specific location on the site. The server 12 may be located on the site or it may be located remotely and be in communication with the site.

The O-NO repurposes a school's intercom system with smart surveillance technology hardware and software, which include an acoustic receiver and transmission function, electronics, data collection, acoustic and video analysis algorithms, and wireless communications. The O-NO allows two way communications for occupants to either send an alert or receive voice alerts or alarms (typical function of a school intercom system) from a designated central location (e.g., principal's office).

The plurality of receiver/transmitters 10 allow O-NO to hear real-time, voice alerts 14 or pre-learned acoustic voice patterns or signatures. An occupant originated voice alert 14 may include one or more verbal phrases such as "O-NO", "active shooter", or "Code Red". The alert 14 is received and processed via a signal conditioner 16. A recognition module 18 is configured to recognize the one or more voice alerts 14 received at different locations. The recognition module 18 may be configured to determine a vocal signature corresponding to the vocal patterns of one or more voice alerts 14. The recognition module 18 may also be configured to analyze one or more indications of duress, such as voice characteristics to identify a threatening situation. The recognition module 18 may also be configured with a spectral analyzer to identify auditory indications of an incident, such as a firearm acoustic signature.

A localization module 20 is configured to receive the auditory signals from the plurality of receiver/transmitters 10 throughout the site. One or more acoustic signals associated with the incident may be processed by the central server 12 to provide for a localization of the incident/assailant on the site based on an acoustic localization by the localization module 20. Because the incident and alerts 14 pertaining to the situation may not necessarily occur in a room or location that has its own mapped receiver/transmitter 10, the incident may likely be transitioning through the site, and different occupants may be vocalizing the voice alert 14, the acoustic signal associated with the event may be sensed by multiple receiver/transmitters 10. For greater granularity in determining the location of the incident, the localization module 20 may determine the position by reference to the acoustic levels of the voice alert 14 according to a selected acoustic signature for each of the voice alerts 14 received.

For example, occupant John, having a first vocal/acoustic signature, may be in the entry and his voice alert 14 may be detected by the receiver/transmitter 10 primarily in the entry, slightly at the primary access point, and faintly at the admin area. Occupant Jane, having a second vocal/acoustic signature, is located in the drive. Her voice alert 14 may be detected most strongly at the primary access point receiver/transmitter 10, and only slightly detected at that located at the entry. The localization module 20 is able to determine that the incident is occurring in the vicinity of the entry and primary access points to the site, based on an analysis of each of the first acoustic signature and then the second acoustic signature.

Figure 3:
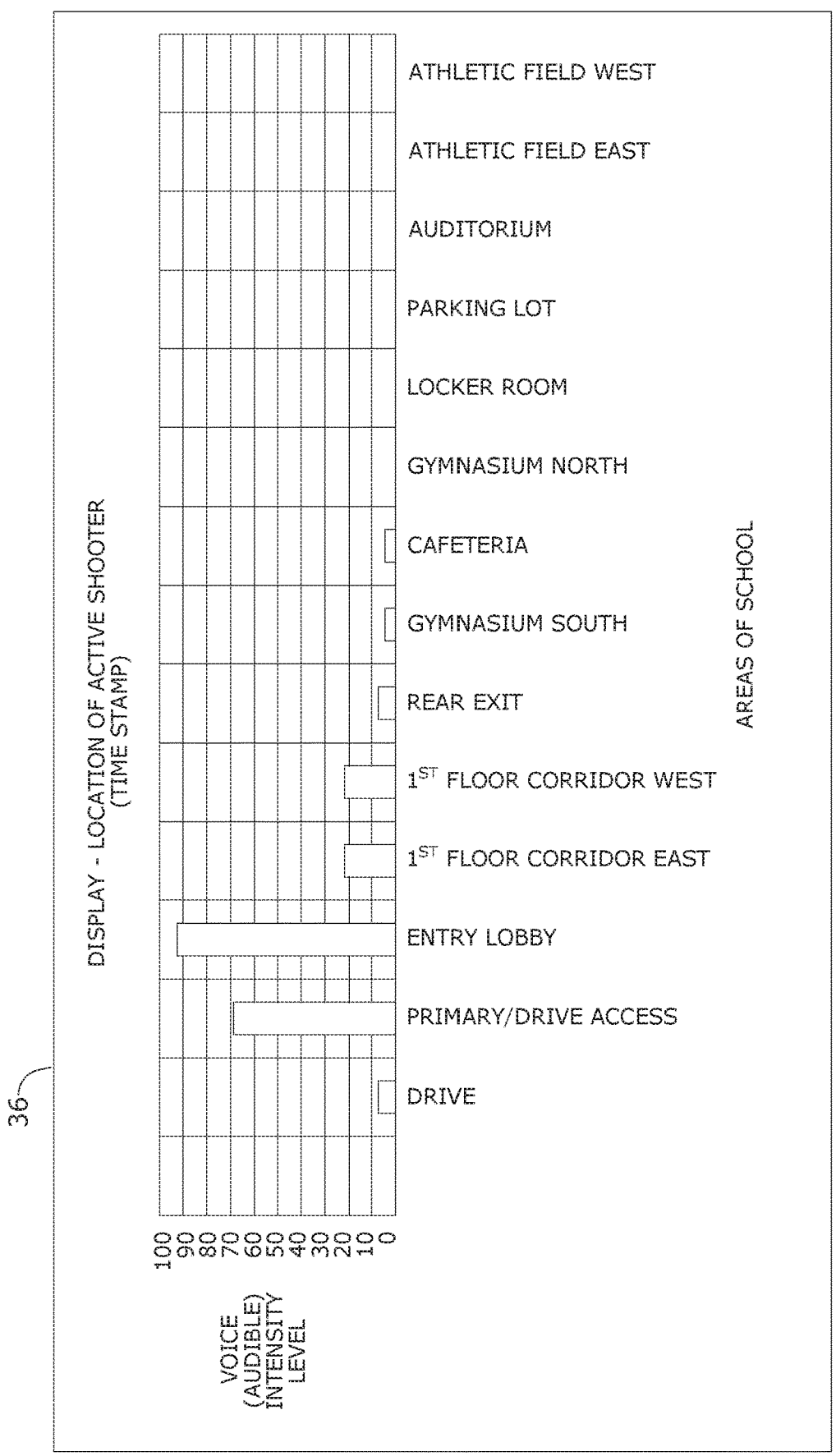
FIG. 3 is an exemplary display of acoustic intensity by site areas corresponding to the site emplacement diagram of FIG. 2.

As seen in reference to FIG. 3, the localization module 20 is configured to generate a localization diagram 36 providing an indication of the location of the incident. In the example shown, the localization diagram 36 includes a depiction of the acoustic level of the alerts 14 received by one or more receiver/transmitters 10. The higher acoustic levels in the "entry lobby" and the "primary/drive access" indicate that the alerts 14 are concentrated towards the front of the site. In other embodiments, the localization diagram may also include a depiction of the site, such as shown in FIG. 1, with an acoustic level presented in the respective areas. The localization diagram 36 permits a threat assessment and a determination of the incident locus to be made real time. In the Marjory Stoneman High School shooting, the school resource officer never entered the school building because he was unaware of the location of the shooter.

In some embodiments, an image analyzer 22 may provide video confirmation of the incident or assailant. The image analyzer 22 may perform an image assessment for detecting an assailant or potential assailant. For example, the image assessment may detect an individual in a long coat with a protrusion in the coat indicating the possibility of the individual having a firearm. The image assessment may also evaluate concealment oversized package or backpack.

The schools emergency response actions may be activated when pre-established threat level thresholds are met, as determined by a threat level assessment module 24. Once activated, a notification module 25 transmits one or more notifications, based on the nature of the incident and a determination of the threat level assessment module 24. For example, as the incident unfolds, emergency response actions would wirelessly notify the SROs 26 and other first responders 28 with vital information to immediately intervene to prevent the loss of life as the most important outcome. The notification module 25 may also provide a notification to facility leadership, such as teachers and staff. 30. The notification module 25 may also activate a general alarm 32 (unique to an active shooter event) to alert all occupants of the facility.

The server 12 may be in communication with an acoustic and image recognition database 34 to facilitate image recognition by the image analyzer 22 and the recognition module 18. The smart intercom receiver/transmitters 10 integrate real-time listening at each deployed location with the ability to understand and convert spoken alerts/instructions to initiate protective actions. As is the case with a typical school intercom system, O-NO speakers 10 would be dispersed throughout the school and school grounds. The algorithm processes signal characteristics and speaker location to identify the location of the shooter. Phrase-directed, voice notification alerts 14 reporting the movement of an assailant, if provided by an occupant, would provide updated information to O-NO.

The O-NO incorporates a sufficient number of input and output channels to 1) accept multiple voice alerts or acoustic signatures from different locations and 2) output information through hard wired or wireless transmission to a recipient population.

While the system may accept inputs from additional devices and sensors 35, the O-NO system does not rely on the deployment of sophisticated sensory devices such as metal or infrared detection for monitoring, nor does it rely on a manually activated voice transmitter. No correlation of sensory device signals is required to activate an alert. Thus, the O-NO system is fully functional with simple spoken recognized phrase(s) 14 that issue the alert(s) (or instructions). False alerts are mitigated though student training and instruction, and discernments such as voice characteristics (e. g., uniqueness and duress), redundancy, and initial notification and evaluation by the SRO.

Input Channels

O-NO accommodates a number of channels for input into the system which may include: recognized phrase(s) voice alerts from any speaker location. Algorithms analyze voice characteristics (words, phrases volume, duress, etc.) and compares to records in a stored database; acoustic signatures from discharge of a firearm, explosion; video signals to determine assailant location, and they are processed for facial and image recognition. For privacy considerations, O-NO has the option to begin video surveillance only after voice alerts are received.

When available, O-NO may accommodate inputs from other deployed devices 35 such deployed metal detectors, cell phone application (App) output, or a surveillance system output. The various inputs received are continuously evaluated through a risk assessment algorithm 36 which assigns a threat level. Emergency actions are taken when predetermined thresholds or conditions are reached.

Output Channels

The O-NO system accommodates a number of channels as output from the system which include: feeding an alarm function unique to active shooter alerts, egress indicators to direct occupants to move to pre-established safe zones or egress routes away from the shooter, wireless connectivity to the cell phone of the SRO (through an App) and others to notify staff and law enforcement of the incident, disclosing the location of the shooter within the school to facilitate rapid engagement of protective force to neutralize the shooter.

Through the input channels, O-NO identifies the threat and monitors the progression of the scenario informing occupants and authorities of the location of the threat. Through the output channels, O-NO monitors and sends crucial information and updates to ensure emergency measures can direct occupants to shelter or flee away from the assault. O-NO output facilitates a rapid and effective response to apprehend the assailant.

The system of the present invention may include at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The computer-based data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail.

It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A system for providing a voice alert notification of an incident at a site having a plurality of discrete occupancy units, comprising:
   an audio receiver/transmitter deployed in one or more of the plurality of discrete occupancy units; and
   a server hosting an incident detection and notification system in communication with the site, the server comprising:
   a recognition module in communication with the audio receiver/transmitter and configured to recognize one or more predetermined voice alerts corresponding to one or more incident types monitored by the system; and
   a localization module configured to determine a location of the incident based on an acoustic level of the voice alert received by one or more of the audio receiver/ transmitters and a mapping of each of the audio receiver/transmitters on the site.

2. The system of claim 1, wherein the recognition module further provides a recognition of a vocal signature corresponding to the voice alert.

3. The system of claim 2, wherein the recognition module provides an indication of duress in the vocal signature.

4. The system of claim 2, wherein the localization module determines the location of the incident based on the acoustic level of the vocal signature of the voice alert.

5. The system of claim 1, further comprising:
a spectral analyzer to correlate an acoustic event with the incident.

6. The system of claim 5, wherein the acoustic event is a firearm discharge.

7. The system of claim 1, wherein the localization module is configured to generate a localization diagram providing a visual indication of the location of the incident on the site.

8. The system of claim 7, wherein the localization diagram includes a depiction of the acoustic level of the voice alerts received by one or more receiver/transmitters.

9. The system of claim 1, further comprising:
a notification module configured to transmits one or more notifications of a detected incident, based on the nature of the detected incident and a role of the intended recipient.

10. The system of claim 9, wherein the notification to a first responder role includes information to contain or suppress an assailant.

11. The system of claim 9, wherein the notification directs an occupant role to shelter in place.

12. The system of claim 9, wherein the notification directs an occupant role to flee from the incident.

13. The system of claim 12, wherein the notification provides egress routing instructions.

14. A system for providing a voice alert notification of an incident at a site having a plurality of discrete occupancy units, comprising:
an audio receiver/transmitter deployed in one or more of the plurality of discrete occupancy units; and
a server hosting an incident detection and notification system in communication with the site, the server comprising:
a recognition module in communication with the audio receiver/transmitter and configured to recognize one or more predetermined voice alerts prior to a discharge of a firearm in an active shooter incident; and
a localization module configured to determine a location of the incident based on an acoustic level of the voice alert received by one or more of the audio receiver/transmitters.

* * * * *